United States Patent [19]
Kemp

[11] Patent Number: 5,661,240
[45] Date of Patent: Aug. 26, 1997

[54] SAMPLED-DATA INTERFACE CIRCUIT FOR CAPACITIVE SENSORS

[75] Inventor: Christopher J. Kemp, Monument, Colo.

[73] Assignee: Ford Motor Company, Dearborn, Mich.

[21] Appl. No.: 533,492

[22] Filed: Sep. 25, 1995

[51] Int. Cl.$^6$ .......................... G01P 15/125; G01L 1/02; G01R 27/26
[52] U.S. Cl. .................. 73/514.32; 73/862.581; 73/1.88; 324/658
[58] Field of Search .................. 73/514.18, 701, 73/862.52, 514.16, 862.581, 1 DV, 514.32; 324/658, 661

[56] References Cited

U.S. PATENT DOCUMENTS

| | | | |
|---|---|---|---|
| 4,736,629 | 4/1988 | Cole | 73/517 R |
| 4,807,482 | 2/1989 | Park et al. | 73/862.68 |
| 4,820,971 | 4/1989 | Ko et al. | 324/61 R |
| 4,922,756 | 5/1990 | Henrion | 73/517 R |
| 5,028,876 | 7/1991 | Cadwell | 324/678 |
| 5,073,757 | 12/1991 | George | 324/677 |
| 5,126,812 | 6/1992 | Greiff | 357/25 |
| 5,325,065 | 6/1994 | Bennett et al. | 324/661 |
| 5,337,260 | 8/1994 | Spangler | 364/571.02 |
| 5,343,766 | 9/1994 | Lee | 73/862.61 |
| 5,345,824 | 9/1994 | Sherman et al. | 73/517 B |
| 5,424,650 | 6/1995 | Frick | 324/688 |
| 5,428,352 | 6/1995 | Bennett | 340/870.37 |
| 5,451,940 | 9/1995 | Schneider et al. | 340/870.37 |
| 5,465,604 | 11/1995 | Sherman | 73/1 DV |
| 5,473,946 | 12/1995 | Wyse et al. | 73/514.18 |

OTHER PUBLICATIONS

"Surface Micromachined Accelerometers" Bernhard E. Boser and Roger T. Howe, University of California, Berkeley, CA 94720–1770.

*Primary Examiner*—Hezron E. Williams
*Assistant Examiner*—Richard A. Moller
*Attorney, Agent, or Firm*—Peter Abolins

[57] ABSTRACT

In one embodiment of the present invention, a sensing system utilizing a capacitive sensor includes an integrator which is connected to the sensor and has an operational amplifier and an integrator capacitor, a reference voltage source, a clock generator generating a 3-phase clock, and a number of switches. The switches, during the first phase of the clock connect the sensor capacitors to the reference voltages and cause the capacitors to become charged, and connect the output and the input of the amplifier cand cause the integrator to be shorted. During the second phase, the switches connect the sensor capacitors contained in the capacitive sensor to the ground and disconnect the input of the integrator from the output of the integrator to cause the charges on the sensor capacitor to be transferred to the integrator capacitor. During the third phase, the switches connect the sensor capacitors to the output of the integrator, and the integrator capacitor to the groung so that the charge is transferred from the integrator capacitor to the sensor capacitors of the capacitive sensor. Thus, the output of integrator becomes a scaled version of the difference over the sum of the sensor capacitors. The scale factor can be adjusted by adjusting the reference voltage.

1 Claim, 1 Drawing Sheet

SAMPLED-DATA INTERFACE CIRCUIT FOR CAPACITIVE SENSORS

BACKGROUND OF THE INVENTION

The invention relates generally to a circuit for converting a signal from a capacitive sensor into a form suitable for signal processing. More specifically, the invention is a circuit for converting the output of a capacitive sensor into a sampled data output signal.

Capacitive sensors are used in applications such as accelerometers and pressure sensors. One type of capacitive sensor is manufactured by micromachining a slab of silicon to form a miniature tilt plate suspended above a substrate by torsion arms. The tilt plate has a center of mass offset from the torsion arm axis such that, under conditions of non-zero acceleration perpendicular to the plate, the plate tilts relative to the underlying substrate. The tilt plate is metallized and forms a common electrode for two capacitors. Two metallized regions are formed on the substrate directly beneath the suspended tilt plate and form the other electrodes of two capacitors with the tilt plate electrode. The geometry of the two metallized regions and the tilt plate is such that under acceleration the capacitance of one capacitor increases while the capacitance of the other decreases since the distance between the tilt plate and the metallized regions on the substrate either decreases or increases.

In operation, a capacitive tilt plate sensor connects one capacitor electrode from each capacitor at a common node. The common node provides an output of the sensor and the two remaining electrodes provide inputs to the sensor. If one capacitance value is denoted by $C_A$ and the other capacitance is value $C_B$, then the output of the sensor is given by the formula:

$$\text{Sensor Output} = \frac{C_A - C_B}{C_A + C_B}$$

While the capacitances of $C_A$ and $C_B$ vary somewhat non-linearly with respect to acceleration, the above formula of the difference over the sum of the capacitors is remarkably linear with respect to acceleration. It is desirable therefore to have a circuit which produces an electrical output proportional to the quantity $$\frac{C_A - C_B}{C_A + C_B}.$$

It is also desirable however to have the flexibility to scale the output voltage so that the circuit can be used in many applications. That is, if the output is scaled, the scale can be adjusted to be within the input range of downstream processing components without further processing.

SUMMARY OF THE INVENTION

One object of the present invention is to advantageously provide an accurate circuit to output a signal proportional to $$\frac{C_A - C_B}{C_A + C_B},$$

where $C_A$ and $C_B$ are capacitor values on a capacitive sensor in a single low cost circuit. Another object is to scale the output of the capacitive sensor.

The present invention is a circuit connected to a capacitive sensor that includes an integrator, a capacitor, a reference voltage source and a number of switches. The switches in one state connect the capacitor as a feedback capacitor around the integrator. In another state the switches switch the capacitors contained in the capacitive sensor as feedback around the integrator. In the first state, the capacitors of the capacitive sensor are charged. Then, in a second state, the charge on the sensor capacitors is transferred to the capacitor around the integrator. In a third phase, the capacitors of the sense element become feedback capacitors for the integrator. Charge then is transferred from the capacitor to the capacitors of the sense element. Thus, the output of the integrator becomes a scaled version of the difference over the sum of the sensor capacitors. The scale can be adjusted by adjusting the reference voltage.

BRIEF DESCRIPTION OF THE DRAWINGS

FIGS. 8A to 8C are non-overlapping clock signals used to control the present invention.

DETAILED DESCRIPTION OF THE PREFERRED EMBODIMENT

Figure 1:
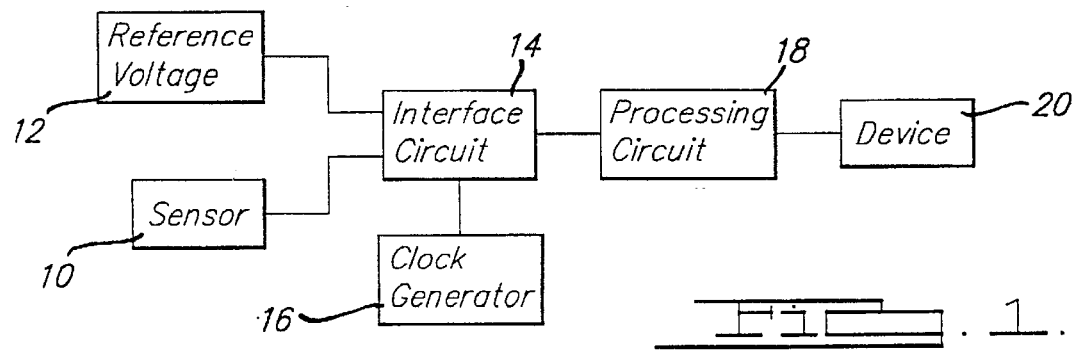
FIG. 1 is a block diagram of a circuit having a sensor and interface circuit according to the present invention.

Referring to FIG. 1, a reference voltage source 12 and a sensor 10 are connected to an interface circuit 14 which is used to convert the output of sensor 10 into a form representative of the function which sensor 10 is monitoring. For example, sensor 10 may be used to monitor acceleration or pressure within an automotive vehicle.

A clock generator 16 is also connected interface circuit 14. Clock generator 16 is used to control the timing of interface circuit 14. A processing circuit 18 is connected to interface circuit 14. The processing circuit processes the output of interface circuit 14 and delivers it to control a device 20. For example, if sensor 10 is an acceleration sensor, processing circuit 18 determines when to deploy a device 20 such as an airbag.

Interface circuit 14 preferably outputs a sampled data output signal. A sampled data output signal is an analog signal that is valid at discrete points in time which typically has some relation to a portion of a clock cycle. If, for example, sensor 10 is an accelerometer, the output of interface circuit 14 would be an analog signal representative of the amount of acceleration in units of gravity applied to sensor 10.

Figure 2:
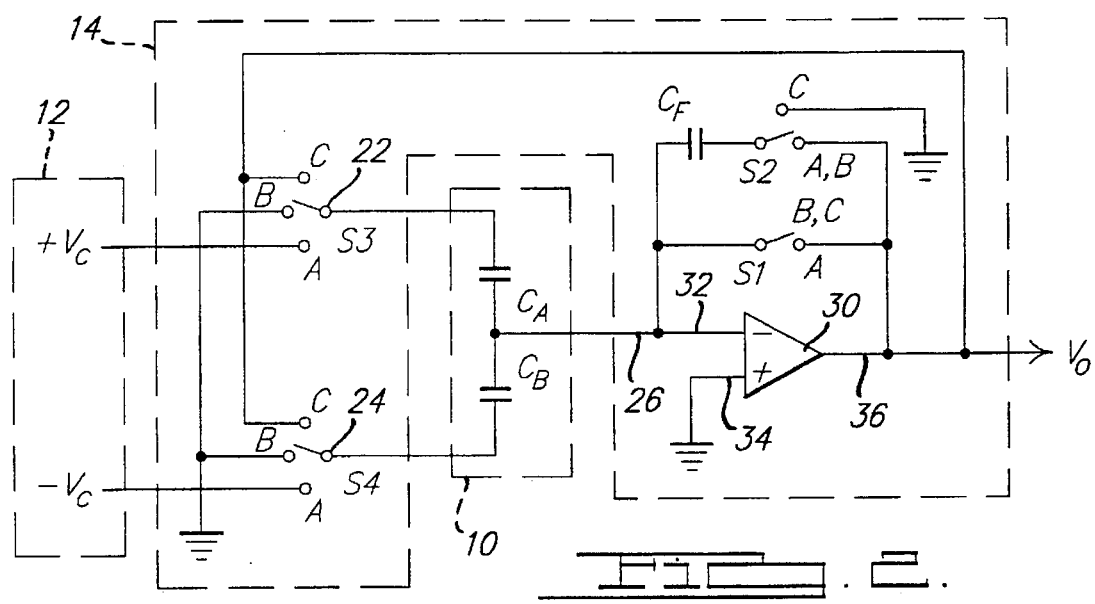
FIG. 2 is a detailed schematic of an interface circuit according to the present invention.

Referring now to FIG. 2, sensor 10, reference voltage source 12 and interface circuit 14 are shown in greater detail. Sensor 10 is formed of two capacitors $C_A$ and $C_B$ connected in series. Input terminals 22 and 24 and output terminal 26 form the electrodes of capacitors $C_A$ and $C_B$. Output terminal 26 is connected at the common node between capacitor $C_A$ and $C_B$.

Reference voltage source 12 preferably provides two reference voltages Vc and −Vc. Reference voltages Vc and −Vc are preferably equal in magnitude and opposite in sign.

Interface circuit 14 has an operational amplifier 30 connected to output terminal 26 of sensor 10. Operational amplifier 30 has an inverting terminal 32, non-inverting terminal 34 and an output terminal 36. Inverting terminal 32 is preferably connected to output terminal 26. Non-inverting terminal 34 is connected to ground. Operational amplifier 30 also has a feedback loop connected between output terminal 36 and inverting terminal 32. The feedback consists of a switch $S_1$ in parallel with a capacitor $C_F$ in series with a switch $S_2$.

Interface circuit 14 also has two switches $S_3$ and $S_4$ that are connected to input terminals 22 and 24 of sensor 10. Each of the four switches shown in FIG. 2 is controlled by the clock generator of FIG. 1 that will be further described below. Each of the four switches has three states: (a), (b) and (c) which correspond to the non-overlapping clock phases of clock generator 16.

Switch $S_3$ in state (a) connects reference voltage Vc to input terminal 22 of sensor 10. Switch $S_4$ in state (a) connects voltage −Vc to input terminal 24. Switches $S_3$ and $S_4$ in states (b) and (c) are identical in operation. In state (b) input terminals 22 and 24 are connected to ground. In state (c) input terminals 24 and 22 are connected to output terminal 36 of operational amplifier 30.

When switches $S_3$ and $S_4$ are in state (c), capacitors $C_A$ and $C_B$ of sensor 10 become a parallel feedback loop to operational amplifier 30. That is, when switches $S_3$ and $S_4$ are in state (c) the parallel combination of $C_A$ and $C_B$ are connected between output terminal 36 and inverting terminal 32 of operational amplifier 30.

Switch $S_1$ in state (a) is closed so that operational amplifier 30 is in a unity gain configuration. In states (b) and (c) switch $S_1$ is opened.

Switch $S_2$ in states (a) and (b) connect capacitor $C_F$ as a feedback capacitor of operational amplifier 30. During states (a) and (b) capacitor $C_F$ is connected between inverting terminal 32 and output terminal 36 of operational amplifier 30. In state (c) switch $S_2$ connects one end of capacitor $C_F$ to ground. In this configuration capacitor $C_F$ becomes an input to operational amplifier 30.

Figure 3A:
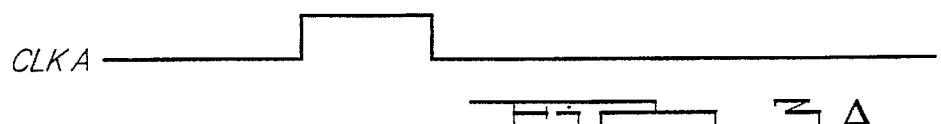
Figure 3B:
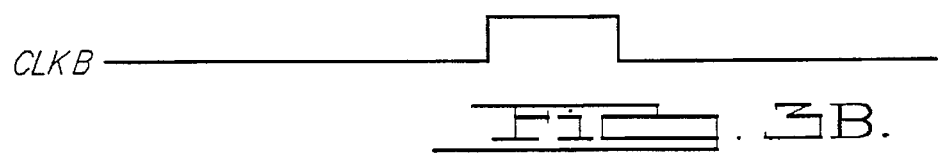
Figure 3C:
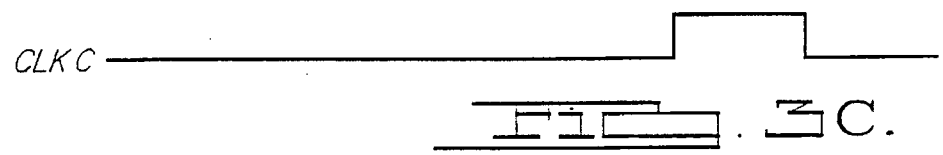

Referring now to FIGS. 3A through 3C, the clock generator of FIG. 1 preferably generates a non-overlapping clock source having three states. FIG. 3A represents state (a) of FIG. 2; FIG. 3B represents state (b) of FIG. 2; and FIG. 3C represents state (c) of FIG. 2. The non-overlapping clock is preferable since the switches of FIG. 2 can only be in one position at any instance in time. Methods for forming such a clock signal are commonly known in the art.

The operation of interface circuit 14 is best understood by understanding the sequence of events that occur during each clock cycle.

During phase (a) the four switches are in position (a) of FIG. 2. $S_1$ is closed so that the operational amplifier 30 is in a unity gain configuration, holding inverting terminal 32 at ground potential. Capacitor $C_F$ is discharged through switch $S_2$. Switches $S_3$ and $S_4$ connect reference voltages Vc and −Vc to input terminals 22 and 24, respectively. Consequently, capacitor $C_A$ is charged to reference voltage Vc and capacitor $C_B$ is charged to reference voltage −Vc.

During clock phase (b) switch $S_1$ is opened while switch $S_2$ remains closed. Capacitor $C_F$ continues to be connected as a feedback loop around operational amplifier 30. Input terminals 22 and 24 of sensor 10 are connected to ground through switches $S_3$ and $S_4$, respectively. Thus, a quantity of charge is deposited on the capacitor $C_F$. The quantity of charge Q is represented by the formula:

$$Q = Vc(C_B - C_A)$$

The voltage Vo at output terminal 36 of operational amplifier 30 at the end of the clock phase (b) becomes:

$$V_O = V_c \left( \frac{C_A - C_B}{C_F} \right)$$

Here, capacitors $C_A$ and $C_B$ of sensor 10 are functioning as inputs to operational amplifier 80. Charge is transferred from capacitor $C_A$ and $C_B$ to capacitor $C_F$.

During clock phase (c) switch $S_2$ is connected to ground so that capacitor $C_F$ becomes an input to operational amplifier 30. Switches $S_3$ and $S_4$ connect capacitor $C_A$ and $C_B$ in parallel between output terminal 36 and inverting terminal 32 of operational amplifier 30. Thus, capacitors $C_A$ and $C_B$ become feedback capacitors in a feedback loop of operational amplifier 30. Consequently, the charge that was deposited on capacitor $C_F$ during phase (b) is moved onto the parallel combination of capacitor $C_A$ and $C_B$. Therefore, the value of the output voltage Vo at the end of clock phase (c) is $$V_O = V_c \left( \frac{C_A - C_B}{C_A + C_B} \right)$$

As shown, the output of sensor 10 is a scaled version of the difference of the capacitances over the sum of the capacitances. Thus the circuit has extracted the signal from the sensor in its most linear form. The scale factor is the magnitude of the reference voltage Vc. Having such a configuration is particularly useful if the voltage ranges of the processing circuit are limited. Voltage Vc can be used to scale the output of sensor to the range of the input to a processing circuit. Voltage Vo represents acceleration as measured by sensor 10 at the end of clock phase (c). Voltage Vo is a sampled data output signal.

Processing circuit 18 may have a sample and hold circuit that will provide a continuous time analog signal representative of the acceleration measured by the sensor which is updated at the end of clock phase (c). Such a continuous time analog signal is desirable in many automotive applications. Processing circuit 18 may also provide a check to ignite a device such as an airbag. Processing circuit 18 may activate an airbag if the acceleration measured by sensor 10 is above a predetermined value.

As would be evident to one skilled in the art, several modifications of the invention may be made while still being within the scope of the appended claims. For example, the sensor may also be configured as a pressure sensor for various automotive or other applications. Another example of a modification is that the interface circuit 14 may also be made differential to provide more noise immunity.

What is claimed is:

1. A sensing system comprising:

an integrator having an input and an output;

a reference voltage source;

a capacitive sensor comprising a plurality of capacitors;

switching means connected to a said integrator, said capacitive sensor, and said voltage source for connecting said voltage source to said capacitive sensor to charge said capacitors with a charge, then for transferring said charge from said capacitors to said integrator, then for transferring said charge from said integrator to said capacitors, and then for outputting said charge as a voltage at said output of said integrator, wherein said voltage is a function of the capacitances of said capacitors; and a clock generator which is connected to said switching means, said clock generator controlling the timing of said connections made by said switching means and generating a non-overlapping clock with three phases.

* * * * *